United States Patent [19]
Fiessinger et al.

[11] Patent Number: 4,485,018
[45] Date of Patent: Nov. 27, 1984

[54] PROCESS OF CLARIFYING WATER

[75] Inventors: Francois Fiessinger, Chaville; Paul Thebault, Teteghem; Daniel Codiasse, Sartrouville, all of France

[73] Assignee: Société Lyonnaise des Eaux et de l'Eclairage, Paris, France

[21] Appl. No.: 498,936

[22] Filed: May 27, 1983

[30] Foreign Application Priority Data

May 28, 1982 [FR] France ................................ 82 09393

[51] Int. Cl.³ .............................................. C02F 1/52
[52] U.S. Cl. .................................... 210/716; 210/737; 210/738; 252/175; 423/493
[58] Field of Search ............... 210/716, 717, 737, 738; 252/175; 423/493, 632

[56] References Cited

U.S. PATENT DOCUMENTS

| | | | |
|---|---|---|---|
| 965,148 | 7/1910 | Angell | 210/737 |
| 2,034,460 | 3/1936 | Darcey | 210/716 |
| 3,497,459 | 2/1970 | Nakamura et al. | 210/702 |
| 3,544,476 | 12/1970 | Aiba et al. | 210/702 |
| 3,833,718 | 9/1974 | Reed et al. | 423/629 |
| 4,057,495 | 11/1977 | Kinoshita et al. | 210/737 |
| 4,405,463 | 9/1983 | Jost et al. | 210/712 |

FOREIGN PATENT DOCUMENTS

| | | | |
|---|---|---|---|
| 49-113798 | 10/1974 | Japan | 423/493 |
| 833547 | 5/1981 | U.S.S.R. | 423/493 |

*Primary Examiner*—Peter Hruskoci
*Attorney, Agent, or Firm*—Wenderoth, Lind & Ponack

[57] ABSTRACT

Process for clarifying water to coagulate and flocculate particles suspended therein, by introducing into the water an aqueous solution of ferric polychloride having a temperature of at least 85° C.

8 Claims, 2 Drawing Figures

PROCESS OF CLARIFYING WATER

BACKGROUND OF THE INVENTION

The present invention relates to a process of clarifying water containing particles suspended therein.

It is known that, to efficiently settle particles suspended in water, reagents are introduced into the water to coagulate the particles. This coagulation is necessary to flocculate the particles and settle them to the bottom.

The use of iron salts as coagulating reagents, ferric chloride in particular, is well known. A commercially available aqueous solution of ferric chloride ($FeCl_3.6H_2O$) in a 40 to 41% concentration by weight is generally used.

The ability of ferric chloride to destabilize colloidal suspensions, and thus its coagulating ability, is a factor of the hydrolysis that follows its dissolution, and of the intermediate formation of compounds likely to polymerize and thus activate the flocculation process. Many authors have studied this hydrolysis. Lamb et al. considered the existence of an unstable equilibrium state between the polymerized phase of ferric hydroxide and its monomeric forms, in an article published as early as 1938 in *J.A.C.S.*, 1938, 61, p.1215-1225. More recently, Hsu et al. showed that stable polymerized solutions of ferric salts could be obtained by heating dilute solutions of $FeClO_4$ to different temperatures, the nature and stability of the hydrolyzates depending on the temperature, and the concentration of iron. *J. Soil Sci.*, 1972, 23, No. 4, p. 49; *Clay & Clay Minerals*, 1973, 21, p. 367-377; *Soil Sci. Soc. of Am. H,* 1980, 44, No. 1, p. 143-149, "Effect of Temperature on the Appearance and Stability of Hydrolyzed Fe $(ClO_4)_3$ Solutions".

According to these various publications, the key factor governing the appearance and the stability of the solutions seems to be the initial degree of oversaturation of the solution in relation to the amorphous hydroxide.

Besides, it is possible to obtain these various compounds by neutralizing the ferric chloride with soda or lime. Their use as replacement for ferric chloride alone as coagulants has already been considered by many authors. P. Rengasamy et al., *Aus. J. Soil Res.*, 1977, 15, p. 1-13; W. Stumm et al., *J.A.W.W.A.*, 1968, 60, p. 514, "Stoichiometry of Coagulation"; W. Stumm et al., *J.A.W.W.A.*, 1962, 54, p. 971-994, "Chemical Aspects of Coagulation".

The use of these solutions has proved to be of little interest for cost reasons, while the results obtained were not significantly different from those obtained by using only ferric chloride.

SUMMARY OF THE INVENTION

The object of the present invention is to coagulate and flocculate particles suspended in water, so as to clarify the water, in an easy, effective and inexpensive manner.

This object is accomplished, in accordance with the present invention, by introducing into the water to be clarified a clarifying amount of an aqueous ferric polychloride solution having a temperature of at least 85° C., to coagulate and flocculate the suspended particles.

DETAILED DESCRIPTION OF THE INVENTION

The process of the present invention is characterized by the fact that a solution of ferric polychloride is prepared at a temperature of at least 85° C., and is maintained at that temperature until and during the time the solution is introduced into the water to be treated.

The aqueous ferric polychloride solution can be prepared by mixing, under agitation, one part by volume of the above-mentioned commercially available aqueous solution of ferric chloride, containing about 41% by weight of ferric chloride, with 3-75 parts by volume of water having a temperature of at least 85° C. A temperature of at least 85° C. is maintained during the mixing of the commercially available aqueous solution of ferric chloride with water, and is maintained until the polychloride solution thus formed is mixed with the water to be clarified.

The use of 3-75 parts by volume of water as indicated above per one part by volume of the commercially available aqueous solution of ferric chloride will provide a polychloride solution having a concentration of 0.05-1.25M, calculated as ferric chloride.

During the preparation of the polychloride solution, i.e. during the dilution of the commercial solution with water, the mixture is agitated, preferably for about 1-10 minutes, depending on the final desired concentration. The higher the desired concentration, the longer the agitation.

As an alternative process of preparing the polychloride solution, the commercially available aqueous solution of ferric chloride can be heated to at least 85° C. while agitating it, for at most 10 minutes.

In both processes of preparing the polychloride solution, the polychloride solution is dark brown in color.

For example, in preparing the polychloride solution by mixing the commercial solution with water, the commercial solution and water, which can be either distilled or tap water, are mixed according to the final desired concentration in a reactor equipped with an agitating device and heated externally by a heating device to a temperature of at least 85° C. The water can come from any system that permits it to be heated to at least 85° C. The polychloride solution thus obtained is then injected in the water to be clarified through an injection rod placed at the base of the reactor and maintained at a temperature of at least 85° C. by any suitable heating system. Thus, the system is maintained at a temperature of at least 85° C. throughout the entire process of preparing the polychloride solution, and up until the polychloride solution is actually introduced into the water to be clarified.

Any apparatus can be used for preparing and using the polychloride solution in accordance with the present invention, as long as it enables satisfaction of the foregoing requirements. Examples of the apparatus are shown in FIGS. 1 and 2.

Figure 1:
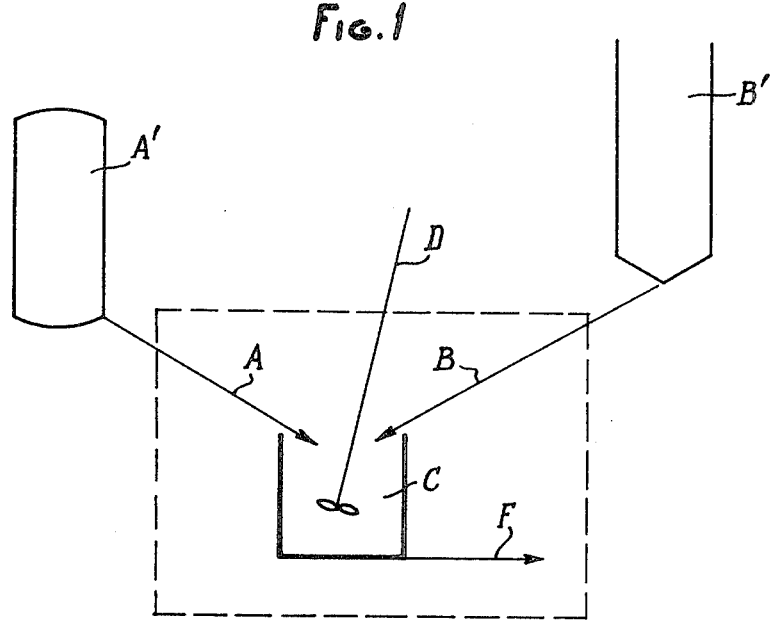
FIG. 1 illustrates an example of an apparatus which can be used to carry out the process of the invention.

Thus, referring to FIG. 1, water, used for dilution, is heated to a temperature of at least 85° C. in container A', and is introduced through pipe A into reactor C. On the other hand, an aqueous solution containing about 41% by weight of ferric chloride, such as the commercially available solution, is introduced from container B' through pipe B into reactor C. The aqueous solution of ferric chloride, can, if desired, be previously heated to a temperature of at least 85° C., prior to introduction into reactor C.

In order to agitate the mixture in reactor C as the mixture is formed, the reactor is equipped with a mechanical agitator, shown in FIG. 1 as stirrer D, although any other agitating means can be employed.

Figure 2:
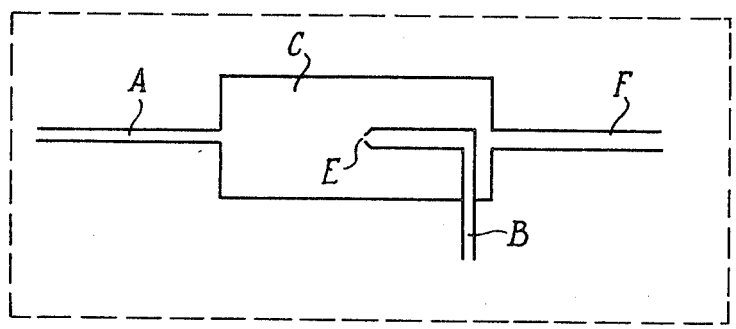
FIG. 2 shows a modification of the apparatus of FIG. 1, wherein the apparatus of FIG. 2 can be substituted for that portion of the FIG. 1 apparatus bounded by dash lines.

An example of another agitating means is shown in FIG. 2, which represents a portion of the apparatus replacing the portion shown in FIG. 1 bounded by dash lines. In FIG. 2, the water for dilution enters reactor C through pipe A, and the aqueous ferric chloride solution enters reactor C through pipe B. Agitation is provided hydrodynamically, by the convergent end E of pipe B, which accelerates the speed of the aqueous solution as it exits pipe B through end E.

In both FIGS. 1 and 2, the polychloride solution thus formed is transferred out of the apparatus through pipe F, while maintaining its temperature at 85° C. or higher.

The present invention will now be more particularly described with reference to the following example.

EXAMPLE

River water was treated by a coagulation with a commercially available ferric chloride solution (solution A) and with aqueous ferric polychloride solutions prepared according to the present invention by dilution with water (solutions B and C), obtained in an apparatus such as the one previously described in connection with FIG. 1. The difference between solutions B and C is the concentration of ferric chloride used in preparing the solutions. In all three cases, the treatment rate was equivalent to the treatment rate usually determined by the classic techniques of water treatment.

Solution B was prepared according to the present invention by adding 4.1 ml of a commercial ferric chloride solution at 41% concentration of 97 ml of demineralized water, previously heated to above 85° C. in a reactor that is heated to 85° C., thus obtaining a 0.15M solution of ferric polychloride, $FeCl_3.6H_2O$.

Solution C is obtained in the same manner, but adjusting the dilution so as to obtain a 0.94M polychloride solution.

The results are recorded in the Tables I and II below using the following legends:

A—commercial solution of ferric chloride at 3.7M of $FeCl_3.6H_2O$.
B—ferric polychloride solution according to the present invention at 0.15M of $FeCl_3.6H_2O$.
C—ferric polychloride solution according to the present invention at 0.94M of $FeCl_3.6H_2O$.

TABLE I

| | Raw water | Water treated with solution A | | Water treated with solution B | |
|---|---|---|---|---|---|
| $FeCl_3.6H_2O$ Treatment rate | | $.28 \times 10^{-3}M$ | $.50 \times 10^{-3}M$ | $.28 \times 10^{-3}M$ | $.50 \times 10^{-3}M$ |
| Temperature (°C.) | 9.5 | | | | |
| pH | 7.8 | 7.1 | 6.8 | 6.85 | 6.50 |
| Turbidity expressed in Jackson units after 10 minutes settling | 7.5 | 2.5 | 2.5 | 1.9 | 2.3 |
| Oxidation potential by permanganate | 7.2 | 3.9 | 3.2 | 3.1 | 2.8 |
| Reduction of organic matter (in %) | | 46 | 55.5 | 57 | 61.1 |

TABLE II

| | Raw water | Water treated with solution A | | Water treated with solution B | |
|---|---|---|---|---|---|
| $FeCl_3.6H_2O$ Treatment rate | | $.25 \times 10^{-3}M$ | $.5 \times 10^{-3}M$ | $.25 \times 10^{-3}M$ | $.5 \times 10^{-3}M$ |
| Temperature (°C.) | 12 | | | | |
| pH | 7.82 | 7.18 | 6.8 | 7.2 | 6.7 |
| Turbidity expressed in Jackson units after 10 minutes settling | 5 | 1.7 | 1.4 | 1.4 | 1.2 |
| Oxidation potential by permanganate | 7.5 | 4.7 | 3.7 | 4.4 | 3.4 |
| Reduction of organic matter (in %) | | 37 | 50.6 | 41.3 | 54.6 |

We claim:

1. A process of clarifying water containing particles suspended therein, which comprises:
    preparing an aqueous ferric polychloride solution by mixing, under agitation, one part by volume of an aqueous solution containing about 41% by weight of ferric chloride with 3-75 parts by volume of water having a temperature of at least 85° C., maintaining a temperature of at least 85° C. during said mixing and until said polychloride solution is mixed with the water to be clarified, to provide said polychloride solution having a concentration of 0.05-1.25M calculated as ferric chloride,
    introducing into said water to be clarified a clarifying amount of said polychloride solution having a temperature of at least 85° C., to coagulate, flocculate and settle said particles, and
    separating said settled particles from the water.

2. A process according to claim 1, wherein said mixing under agitation is carried out for 1-10 minutes.

3. A process according to claim 1, wherein said mixing under agitation is carried out in a reactor maintained at a temperature of at least 85° C. provided with means to effect said agitation.

4. A process according to claim 3, wherein said agitation means comprises a mechanical agitator.

5. A process according to claim 3, wherein said agitation means comprises hydrodynamic means.

6. A process of clarifying water containing particles suspended therein, which comprises:

preparing an aqueous ferric polychloride solution by heating, under agitation, an aqueous solution containing about 41% by weight of ferric chloride to a temperature of at least 85° C. for up to 10 minutes, maintaining a temperature of at least 85° C. during said mixing and until said polychloride solution is mixed with the water to be clarified, to provide said polychloride solution having a concentration of 0.05–1.25M calculated as ferric chloride, introducing into said water to be clarified a clarifying amount of said polychloride solution having a temperature of at least 85° C., to coagulate, flocculate and settle said particles, and separating said settled particles from the water.

7. A process according to claim 6, wherein said heating under agitation is carried out in a reactor maintained at a temperature of at least 85° C. provided with means to effect said agitation.

8. A process according to claim 7, wherein said agitation means comprises a mechanical agitator.

* * * * *